United States Patent

Willmore et al.

[11] Patent Number: 6,094,027
[45] Date of Patent: Jul. 25, 2000

[54] VEHICLE MEMORY MIRROR POSITION TRANSDUCER

[75] Inventors: David K. Willmore; Robert E. Schnell, both of Holland, Mich.

[73] Assignee: Donnelly Corporation, Holland, Mich.

[21] Appl. No.: 09/228,579

[22] Filed: Jan. 11, 1999

[51] Int. Cl.[7] ................................. B60R 1/072
[52] U.S. Cl. .................... 318/652; 318/663; 318/466
[58] Field of Search ............................. 318/652, 663, 318/666, 466, 468, 470

[56] References Cited

U.S. PATENT DOCUMENTS

| | | | |
|---|---|---|---|
| 4,476,356 | 10/1984 | Nakayama et al. | 200/6 A |
| 4,504,117 | 3/1985 | Mittelhauser | 359/876 |
| 4,678,295 | 7/1987 | Fisher | 350/634 |
| 4,894,650 | 1/1990 | Krieg et al. | 340/825.52 |
| 4,940,322 | 7/1990 | Hamamoto et al. | 359/873 |
| 4,986,646 | 1/1991 | Hamamoto et al. | 350/637 |
| 5,142,209 | 8/1992 | Barrs | 318/265 |
| 5,196,965 | 3/1993 | Lang et al. | 359/841 |
| 5,233,228 | 8/1993 | Krieg | 307/10.1 |

FOREIGN PATENT DOCUMENTS

| | | |
|---|---|---|
| 3627438A1 | 2/1988 | Germany . |
| WO9605080 | 2/1996 | WIPO . |

*Primary Examiner*—Bentsu Ro
*Attorney, Agent, or Firm*—Van Dyke, Gardner, Linn & Burkhart, LLP

[57] ABSTRACT

A memory actuator is provided for a rearview mirror system having a reflective element and a controller. The memory actuator includes a housing and at least one positioning member extending from the housing to move the reflective element about at least one degree of freedom. At least one motor is provided for driving the positional member. A linear position transducer having a body is provided for coupling to the reflective element and a circuit board is positioned in the housing. The body of the linear position transducer is guided at the circuit board in at least one direction and moves alone the circuit board between a plurality of positions in response to movement of the reflective element about the at least one degree of freedom. The circuit board is configured to generate a signal to the controller as a function of the position of the body of the linear position transducer along the circuit board.

63 Claims, 7 Drawing Sheets

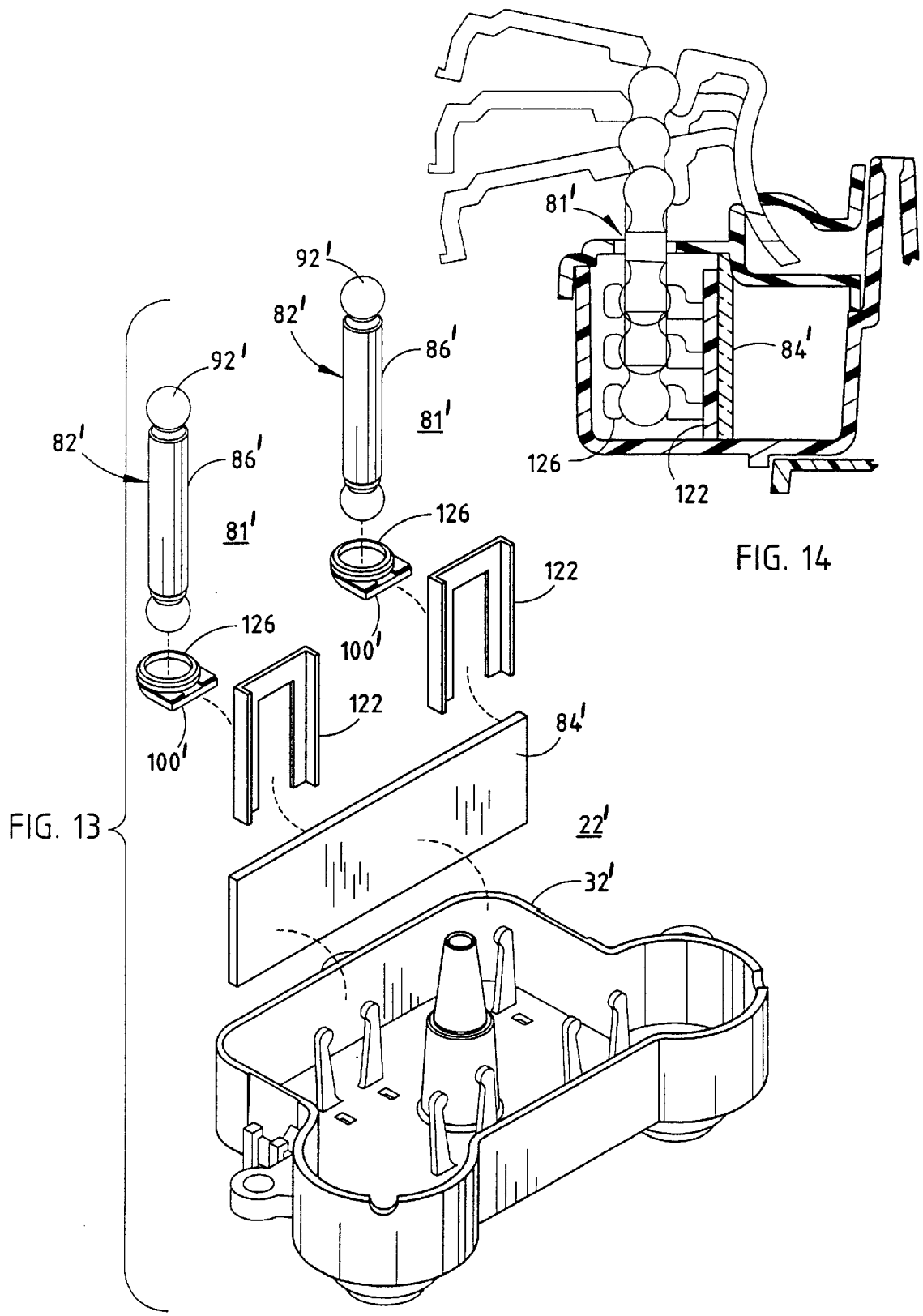

VEHICLE MEMORY MIRROR POSITION TRANSDUCER

BACKGROUND OF THE INVENTION

This invention relates generally to vehicle rearview mirror systems and, more particularly, to mirror systems in which at least one mirror position is stored in a memory device and may be recalled and the mirror driven to the stored position. The invention is particularly directed to a position transducer which monitors the position of the mirror as part of the vehicle memory mirror function.

A vehicle memory system includes an actuator that is capable of independently adjusting a reflective element in two different degrees of freedom. A controller includes a memory device for storing at least one mirror position which may be retrieved and the mirror driven to that position with respect to each of the degrees of freedom. In order to do so, it is necessary to provide positional feedback to the controller in order for the controller to know the position of the mirror with respect to each degree of freedom. Accordingly, the actuator also includes a pair of position transducers to monitor the position of the mirror with respect to such degrees of freedom. The position transducers may be linear position transducers which are movable with respect to an outer portion of the mirror opposite the motor driving the mirror with respect to that degree of freedom. Thus, although the mirror is moved in an arcuate motion, the position of the mirror is monitored as a linear movement of the linear position transducer.

One technique that has been proposed is to utilize a Hall-effect sensor. While such Hall-effect sensors operate reasonably well, they are relatively expensive for automotive applications and, therefore, add significant cost to a memory feature of the mirror system. Another approach is to provide a pair of spaced apart parallel conductive tracks typically arranged as a voltage divider and a brush mechanism spanning the traces. By suitable connection of such circuit to a controller, the position of the brush along the traces may be monitored as a signal produced by the traces, which varies as a function of the brush on the traces. Therefore, by providing a suitable coupler between the brush and the reflective element, the position of the reflective element with respect to a degree of freedom can be monitored by the signal supplied to the controller.

In one such linear position transducer, the coupler is an elongated rod which rides in a cylindrical cavity. A first end of the rod is joined for movement with the reflective element and the opposite end is enlarged and provided with an arcuate outer surface which is rotatably slidably guided by the walls of the cavity. A mounting member for the brush projects through an opening in the cavity wall and thereby moves the brush along an adjacent circuit board. In addition to being relatively expensive to produce, the relatively large separation distance between the brush and the rod causes the relative spacing between the brush and the circuit board to be varied as the elongated member rotates within the cavity. This makes spacing between the cavity and circuit board critical and requires the brush to be capable of accommodating substantial movement between its support and the circuit board while maintaining acceptable contact pressure with the resistive traces.

SUMMARY OF THE INVENTION

The present invention provides a linear transducer for monitoring a position of a reflective element in a vehicular rearview mirror system memory actuator that is of a low cost and easy to assemble and that provides accurate and repeatable indication of the position of the reflective element.

A vehicular mirror system memory actuator for a rearview mirror system having a reflective element and controller includes a case, at least one positioning member extending from the case to move the reflective element about at least one degree of freedom and at least one motor driving the positioning member. The memory actuator further includes a linear transducer having a body for coupling to the reflective element and a circuit board positioned in the case. The body of the linear transducer is guided at the circuit board in at least one direction and moves along the circuit board between a plurality of positions in response to the moving of the reflective element about the at least one degree of freedom. The circuit board is configured to generate a signal to the controller as a function of the position of the body of the linear actuator along the circuit board.

Because the linear transducer body is guided by the circuit board in at least one direction, the necessity for separate mechanisms to guide linear movement of the transducer body are significantly reduced. Furthermore, the sensing mechanism, which may be, for example, a pair of resistive strips on the circuit board and a pair of contact portions on the linear transducer for contacting the reflective strips, can be consistently maintained in contact because the linear transducer body may be guided by the circuit board in the direction of contact between the contact portions and the resistive strips.

Preferably, the linear transducer body includes a pair of arms which engage the circuit board and, most preferably, straddles the circuit board. In this manner, projecting members from one or both of the arms may engage the circuit board and thereby allow the body to pivot on the circuit board about the projecting members. The contact portions may be supported on one of the pair of arms and an opening formed in the other of the pair of arms opposite to the contact portions. This facilitates the assembly of the pair of contact portions to the first arm by allowing the assembly to take place through the opening. Thus, the linear transducer body may be readily assembled using automated assembly techniques, such as insert molding, heat staking, interference fit, or the like. Furthermore, the assembly may be completed by inserting the circuit board in appropriate locations within the actuator case and straddling the linear transducer arms over the circuit board. It is further possible to apply linear actuators used to sense the position of the reflective element about two separate degrees of freedom on a common circuit board which thereby facilitates the overall assembly of the rearview mirror system memory actuator.

These and other objects, advantages and features of this invention will become apparent upon review of the following specification in conjunction with the drawings.

BRIEF DESCRIPTION OF THE DRAWINGS

FIG. 13 is an exploded perspective view of an alternative embodiment of a rearview mirror system memory actuator according to the invention; and FIG. 14 is an elevational view of the memory actuator in FIG. 13 showing movement of the linear transducer thereof.

DESCRIPTION OF THE PREFERRED EMBODIMENT

Figure 1:
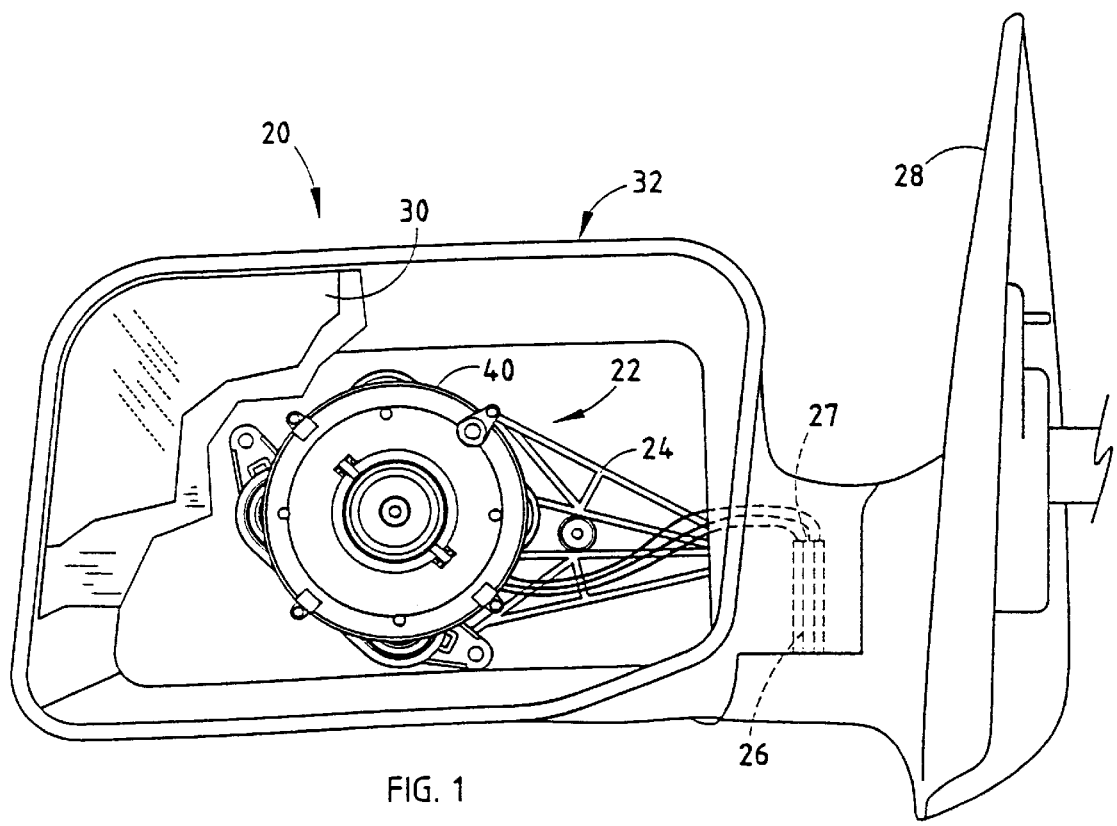
FIG. 1 is a rear elevation of an exterior rearview mirror system according to the invention with a portion of the reflective element removed to reveal internal components thereof.

Referring now specifically to the drawings, and the illustrative embodiments depicted therein, a vehicular exterior mirror assembly 20 includes an actuator 22, which is mounted by a bracket 24 through a pivot post 26 to a portion 28 of a vehicle (FIG. 1). A mirror reflective element 30 is supported by actuator 22 in a manner that provides adjustability to the plane of the mirror element about two axes which are generally aligned with earth's vertical and horizontal axes (not shown). Mirror element 30 may be an electro-optic mirror element capable of a partial reflectance level, such as an electrochromic mirror element, or may be a non-electro-optic mirror element, such as a chrome mirror or the like. Pivot post 26 provides a breakaway feature of mirror assembly 20 such that engagement with a fixed or moveable object will tend to result in folding of the mirror forwardly and rearwardly rather than destruction of the mirror. However, pivot post 26 could also provide a foldaway feature to mirror assembly 20 such that the mirror assembly can be folded close to the vehicle body by a motor (not shown) in response to actuation by an actuator as is known in the art. A housing 32 generally surrounds actuator 22 and bracket 24 and is also attached to pivot post 26 or to bracket 24. Pivot post 26 is hollow including a through-opening 27 through its pivot axis.

Figure 2:
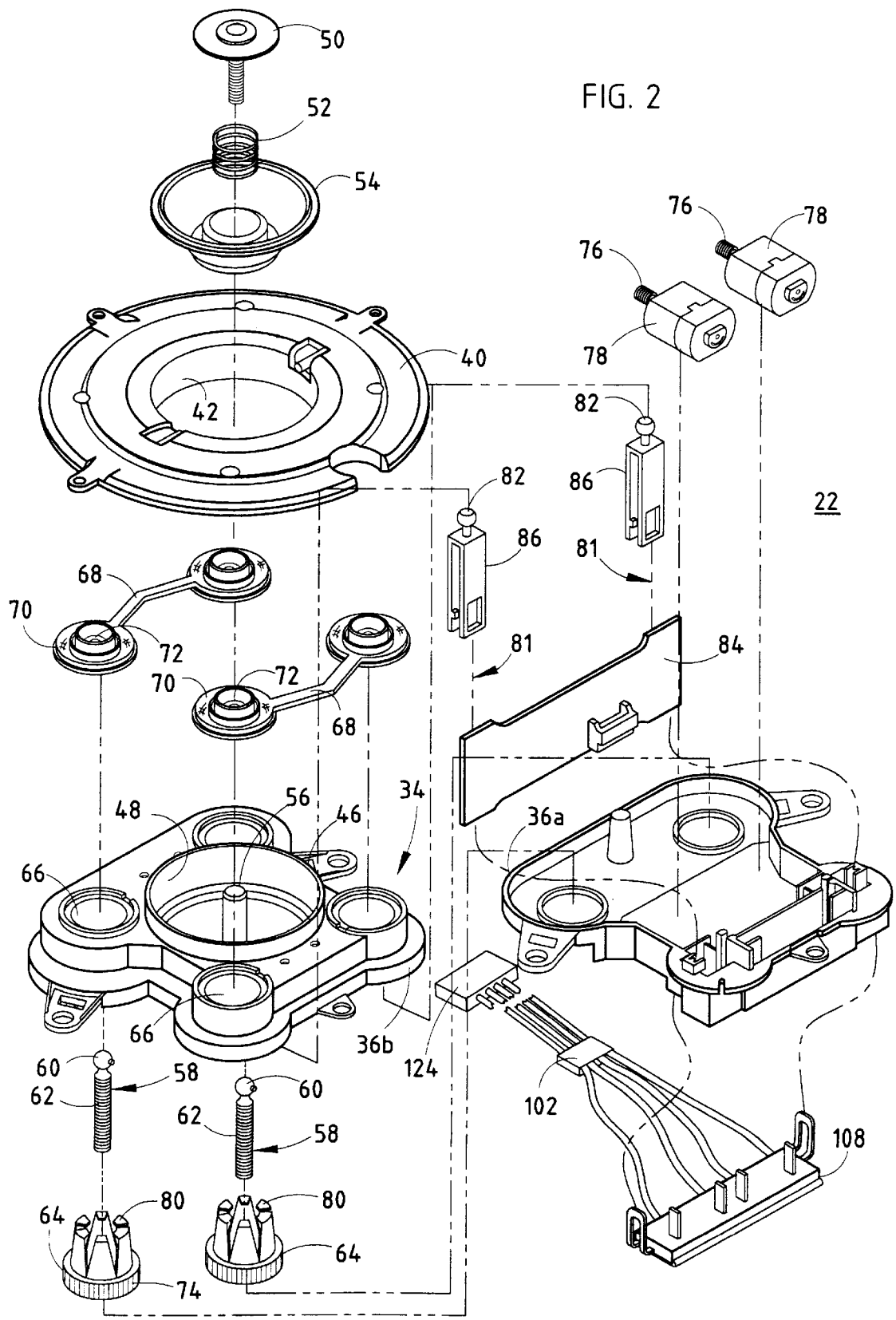
FIG. 2 is an exploded perspective view of a rearview mirror memory actuator according to the invention.
Figure 3:
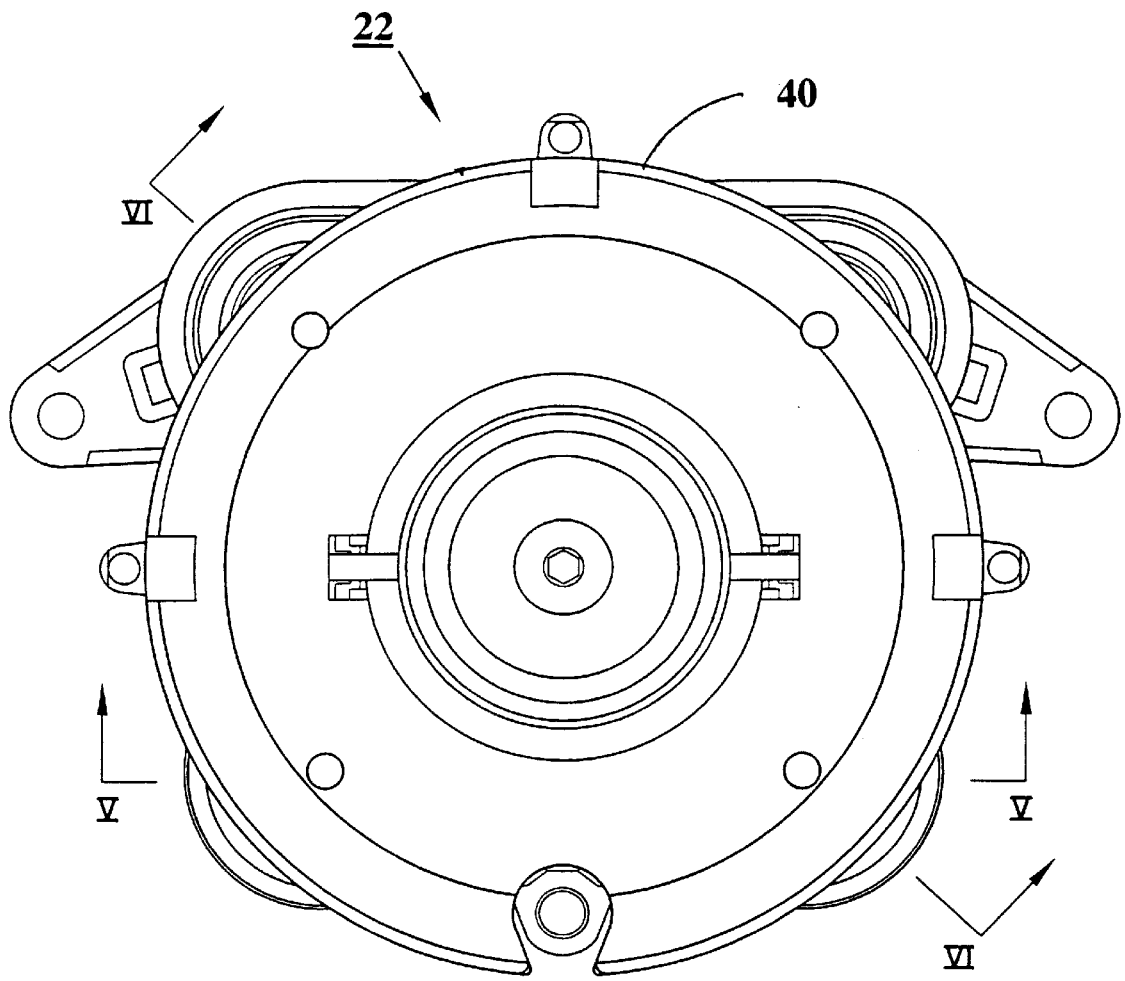
FIG. 3 is a rear elevation of the memory actuator in FIG. 1.
Figure 4:
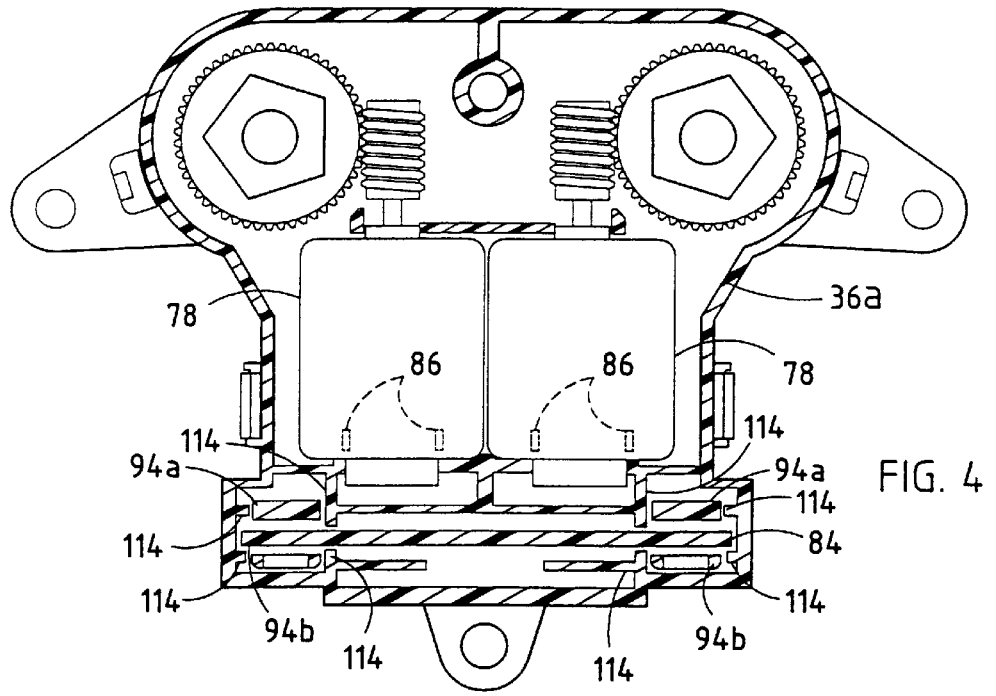
FIG. 4 is the same view as FIG. 3 with the upper portion of the memory actuator, and components mounted to the upper portion of the housing removed in order to reveal internal features thereof.
Figure 5:
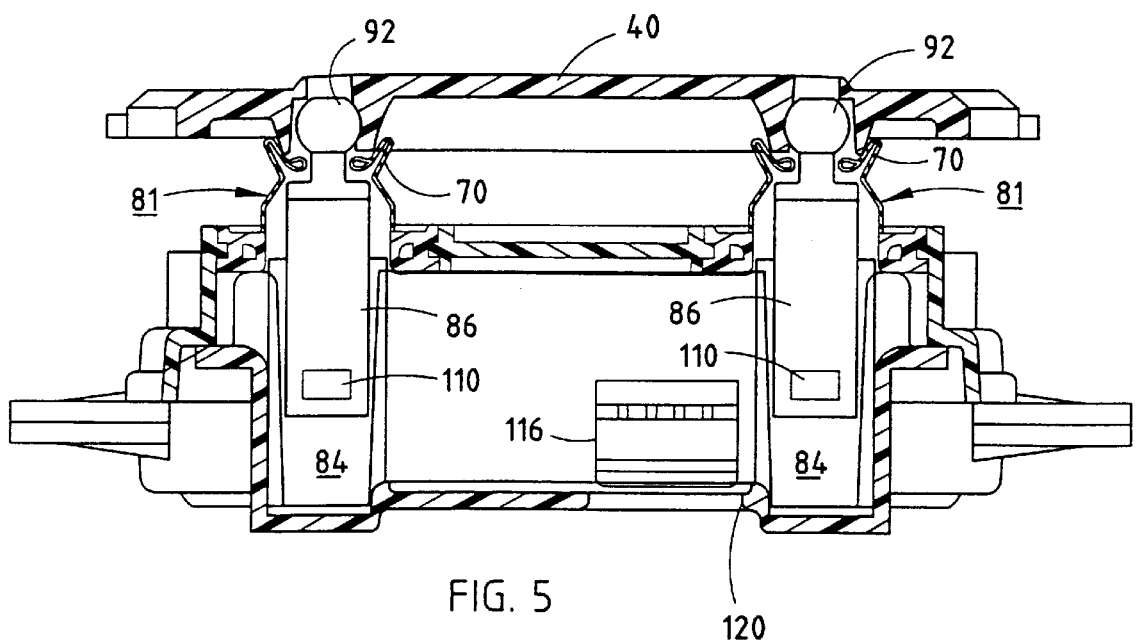
FIG. 5 is a sectional view taken along the lines V—V in FIG. 3.
Figure 6:
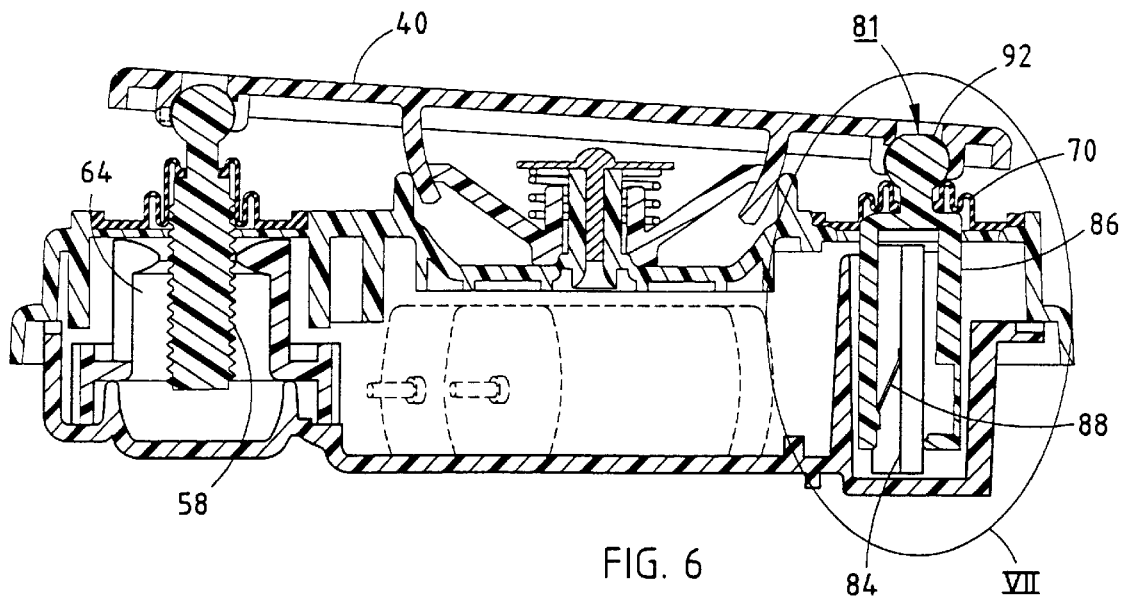
FIG. 6 is a sectional view taken along the lines VI—VI in FIG. 3.
Figure 7:
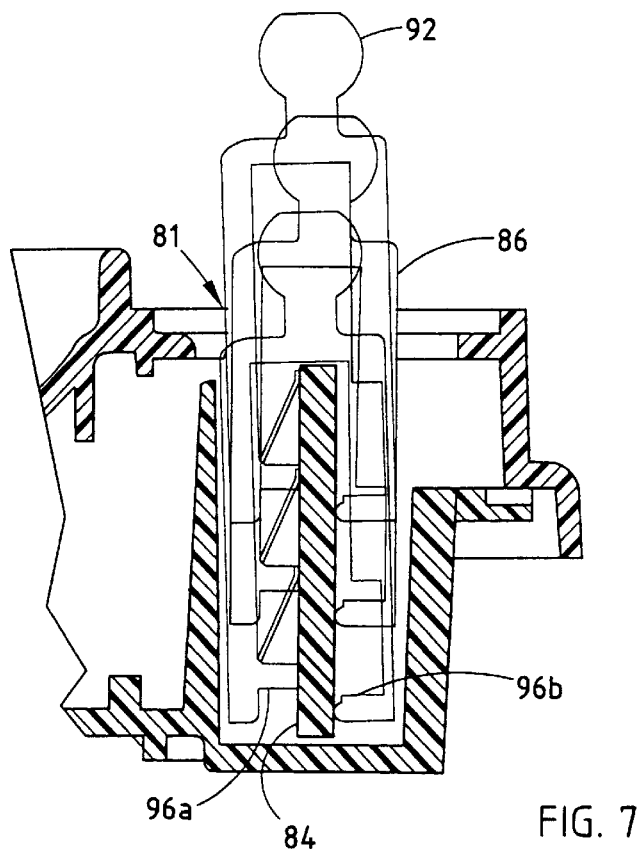
FIG. 7 is an enlarged view of the portion designated VII—VII in FIG. 6 showing movement of the linear actuator in response to movement of the reflective element of the mirror system about an associated degree of freedom.
Figure 8:
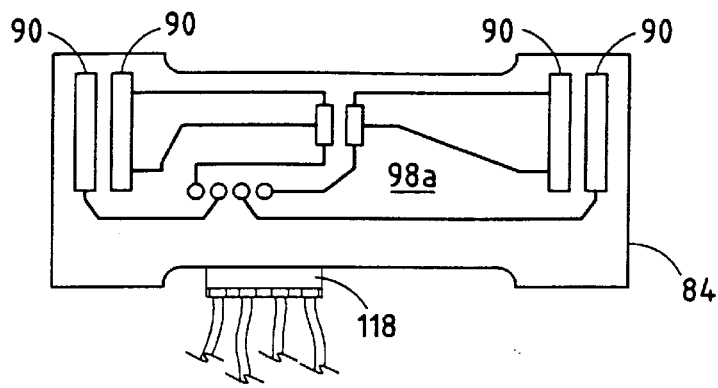
FIG. 8 is an elevational view of a circuit board useful with the invention.
Figure 9:
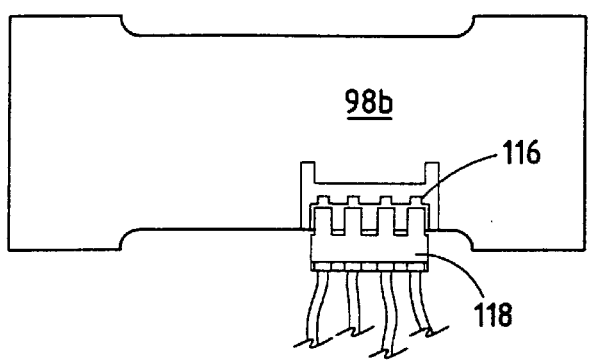
FIG. 9 is a view of the reverse side of the circuit board shown in FIG. 8.
Figures 10, 11, 12:
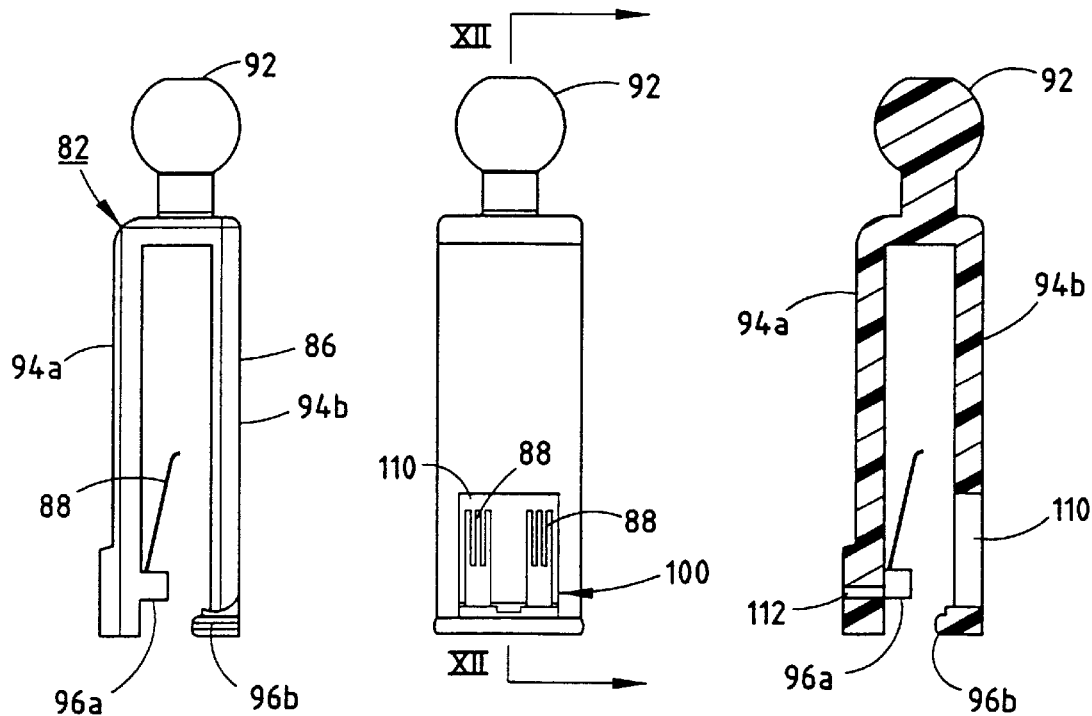
FIG. 10 is a side elevation of a linear transducer body according to the invention.
FIG. 11 is a rear elevation of the linear transducer body in FIG. 10.
FIG. 12 is a sectional view taken along the lines XII—XII in FIG. 11.

Actuator 22 includes a case 34 made up of complimentary case portions 36a and 36b (FIG. 2). A mirror mounting flange 40 is pivotally positionable with respect to case 34 in a manner which is described in copending application Ser. No. 09/047,846 filed Mar. 25, 1998, by Robert E. Schnell for a PIVOT SUPPORT FOR ADJUSTABLE REARVIEW MIRROR, the disclosure of which is hereby incorporated herein by reference. Suffice it to say, mounting flange 40 includes an outer conical surface (not shown) on a portion 42 which is in slidable contact with an edge 46 defined by a generally cylindrical wall 48 of case portion 36b. Mirror mounting flange 40 is biased into moveable engagement with case 34 by a fastener 50 and spring biasing member 52 which biases a retention cup 54 in the direction of case 34 by engagement with a post 56 extending from case portion 36b.

Mirror mounting flange 40 is rotated independently about two generally orthogonal axes, or degrees of freedom, by a pair of screwjacks 58. Each screw jack has a ball 60 which is received within a socket (not shown) of mirror mounting flange 40 and a threaded shaft 62 which threadably engages an internal thread 80 of a rotatable nut member 64. An opening 66 through which screw jack 58 extends is sealed by a gasket member 68 having a seal 70 overlying opening 66. Each seal 70, in turn, has an opening 72 through which ball 60 can protrude as disclosed in application Ser. No. 08/838, 008 filed Apr. 14, 1997, entitled HOUSING WITH INTEGRAL WEATHER SEAL, WITH NOISE DAMPENERS FOR A REARVIEW MIRROR ACTUATOR ASSEMBLY, the disclosure of which is hereby incorporated herein by reference. Each nut member 64 includes an external ring 74 having gear teeth formed thereon which is rotatably engaged with a worm gear 76 of an electric DC motor 78. In this manner, rotation of worm gear 76 by motor 78 rotates nut member 64 which extends or retracts screw jack 58 by threadable engagement between threaded shaft 62 and internal threads 80 on nut member 64. Although the above is a preferred mechanism for pivotably positioning the mirror mounting flange with respect to the case, other mechanisms known in the art may also be used.

Mirror assembly 20 further includes a wire harness 102 which is made up of a plurality of wires 104, each of which is electrically and mechanically joined with an electrical terminal of a connector assembly 108. The details of wiring harness 102 are disclosed in application Ser. No. 09/228,348 filed concurrently with the present application by Robert E. Schnell and David K. Willmore for a MIRROR ACTUATOR ELECTRICAL CONNECTOR (Attorney Docket No. DON01 P-713), the disclosure of which is hereby incorporated herein by reference.

Mirror assembly 20 is a memory mirror system which is capable of being repositioned to one or more positions stored in a memory device (not shown) by a controller (not shown). An example of a control system for a memory mirror is disclosed in commonly assigned U.S. Pat. No. 5,796,176 entitled MEMORY MIRROR SYSTEM FOR VEHICLES, the disclosure of which is hereby incorporated herein by reference. Memory mirror system 20 includes a position monitoring device, such as linear position transducer 81, coupled to reflective element 30 that produces a signal indicative of the position of reflective element 30 with respect to an axis of movement or degree of freedom. The signal produced by the transducer is used in a closed-loop control to allow a controller (not shown) to reliably position reflective element 30 to one or more particular positions stored in the memory of the controller. In this manner, for example, positions of the mirror for different drivers can be stored in memory and retrieved in order to set the mirrors for that driver. In particular, as each motor 78 positions mirror-mounting flange 40 about its associated axis, or degree of freedom, the position of the mirror-mounting flange and, hence, the reflective element, with respect to that axis or degree of freedom, is monitored by the corresponding linear position transducer 81.

Each linear position transducer 81 includes a coupler 82 which slidably engages a circuit board 84 such that circuit board 84 guides coupler 82 in at least one direction. In the illustrated embodiment, that direction is normal to the plane of circuit board 84. As previously set forth, there is one linear position transducer associated with each motor 78. In this manner, as a motor 78 pivots mounting flange 40 about an axis, or degree of freedom, a linear position transducer 81 monitors the movement of the mounting flange and, hence, the reflective element about that axis or degree of freedom. Preferably, the coupler 82 associated with the two linear position transducers slidably engage a common circuit board 84. This further enhances the simplicity of the design and ease of assembly of the actuator 22.

Coupler 82 has a body 86 and a brush assembly defining a pair of contacts 88 electrically interconnected with each other. Each contact 88 makes ohmic contact with a respective resistive trace 90 of circuit board 84 (FIGS. 8–12). Body 86 includes a head 92 which pivots within a socket (not shown) of mirror-mounting flange 40 in order to accommodate the angular deviation between the mounting flange and body 86 throughout the range of movement of both as the mounting flange moves about the degree of freedom monitored by that linear position transducer. Body 86 additionally includes a pair of arms 94a and 94b, each of which includes a projection 96a, 96b generally at a terminal portion of the respective arm. Projections 96a, 96b glide along the front and back surfaces 98a, 98b of circuit board 84 and facilitate a pivoting movement of body 86 in a direction normal to surfaces 98a, 98b. Projections 96a, 96b further provide spacing of the brush assembly 100 which defines contacts 88 from surface 98a of circuit board 84. In this manner, projections 96a, 96b ensure that a relatively consistent contact pressure is made between contacts 88 and resistive traces 90.

A through-opening 110 is defined in arm 96b generally opposite the location of brush assembly 100. Opening 110 facilitates the joining of brush assembly 100 to leg 94a by providing access to the inner surface of leg 94a to allow brush assembly 100 to be assembled from a single direction to arm 94a. This feature facilitates the use of automatic assembly of the brush to the coupler 82. Brush assembly 100 can be attached to arm 94a using known techniques, such as heat-staking, adhesive bonding, or the like. In the illustrative embodiment, a recess 112 is provided in arm 94a in order to receive, in an interference-fit relationship, a portion of brush assembly 100. The skilled artisan would appreciate that other known techniques could be utilized to fasten brush assembly 100 to arm 94a, such as heat staking, insert molding, or the like.

As previously set forth, circuit board 84 guides coupler 82 in a direction generally normal to the plane of surfaces 98a, 98b of the circuit board. A plurality of restraints 114 are formed in housing 36a on opposite sides of arms 94a and 94b and configured to guide coupler 82 in a direction generally parallel to the plane defined by surfaces 98a, 98b of circuit board 84. In this manner, coupler 82 is guided both laterally and longitudinally as it reciprocates with respect to circuit board 84. It should be understood that restraints 114 are configured in order to provide sufficient clearance to accommodate limited pivotal motion of the coupler 82 with respect to the restraints 114. This is because the slide pivots in response to the arcuate motion of mirror-mounting flange 40. The loose frictional coupling between projections 96a, 96b and circuit board 84 provides pivotal motion in the direction of restraints 114 as well as in the direction normal surfaces 98a and 98b of circuit board 84.

Circuit board 84 includes two pairs of resistive traces 90 in order to generate a signal for both linear position transducers 81. As is known in the art, each pair of resistive traces 90 forms a voltage divider with one trace of each pair providing a voltage gradient and the other trace receiving a variable voltage coupled from the one trace as a result of movement of brush assembly 100 along the respective pair of traces. A connector 116 supplies voltage to operate the linear position transducers and to receive the output signal therefrom and to supply the output signal to a controller (not shown). Connector 116 may be coupled with a connector 118 of a wiring harness which passes through opening 27 of pivot post 26 in order to provide electric connectivity with circuit board 84 in the manner previously described. In order to facilitate disconnectivity, an opening 120 is defined in housing portion 36b in alignment with connector 116 whereby inner connection with both linear position transducers 81 may be provided with a single external connector 118.

In an alternative embodiment, a vehicle exterior mirror assembly includes an actuator 22' having a case or housing 32' and a circuit board 84' mounted within housing 32'. A pair of linear position transducers 81' each include a coupler 82' and a glide member 126 which supports a brush assembly 100'. Glide member 126 is guided by circuit board 84' by a respective track 122 juxtaposed with circuit board 84'. Preferably, track 122 is bonded to circuit board 84', but could be held in juxtaposition therewith by common mounting to a common substrate or the like. As the reflective element (not shown) moves about mutually exclusive degrees of freedom, each coupler 82' moves the respective glide member 126 along track 122. As with the previous embodiment, circuit board 84' includes two pairs of resistive tracks in order to develop a signal to represent the position of each brush assembly 100' with respect to the circuit board. Each coupler 82' includes a body 86' having a first ball 92' for engaging the reflective element and a second spherical ball member 124 which pivotally engages glide member 126. In this manner, the rocking movement of body 86' is accommodated by the rotational coupling between head 124 and glide member 126.

Other embodiments will suggest themselves to the skilled artisan. For example, although both linear transducers preferably reciprocate with respect to a single circuit board, the invention could also be implemented with separate circuit boards for each linear position transducer. Furthermore, although the invention is illustrated for use with resistive traces on the circuit board which are engaged by a brush assembly, other transducing phenomena may be utilized, such as Hall-effect sensing, capacitive sensing, inductive sensing, and the like. Although the glide member is illustrated as being supported by the circuit board surface, it could also be supported by surfaces affixed on or adjacent to the surface of the circuit board.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A vehicular rearview mirror system memory actuator for a rearview mirror system having a reflective element and a controller said memory actuator comprising:

a case;
   at least one positioning member extending from said case to move the reflective element about at least one degree of freedom;
   at least one motor driving said positioning member;
   a linear position transducer having a body for coupling to the reflective element; and
   a circuit board positioned in said case, said body of said linear position transducer being guided at said circuit board in at least one direction and moving along said circuit board between a plurality of positions in response to the movement of the reflective element about the at least one degree of freedom, said circuit board being configured to generate a signal to the controller as a function of the position of the body of the linear position transducer along said circuit board.

2. The memory actuator according to claim 1 wherein said body includes a ball member, said ball member for coupling to the reflective element.

3. The memory actuator according to claim 2 wherein said body has a glide member opposite said ball member, said glide member guided by said circuit board.

4. The memory actuator of claim 3 wherein said glide member is guided by a track member juxtaposed with said circuit board.

5. The memory actuator according to claim 1 wherein said circuit board includes first and second resistive strips.

6. The memory actuator according to claim 5 wherein said first and second resistive strips are spaced apart, said linear position transducer having a pair of contact portions for engaging said resistive strips when said linear position transducer moves along said circuit board.

7. The memory actuator according to claim 6 wherein said body includes a pair of arms, said arms engaging said circuit board.

8. The memory actuator according to claim 7 wherein said arms straddle said circuit board and move said pair of contact portions along said first and second resistive strips, respectively, in response to the movement of the reflective element.

9. The memory actuator according to claim 7 wherein at least one of said arms includes a projecting member, said projecting member engaging said circuit board.

10. The memory actuator according to claim 7 wherein each of said arms includes a projecting member, said projecting members engaging said circuit board whereby said body is pivotal on said circuit board about said projecting members.

11. The memory actuator according to claim 7 wherein said pair of contact portions are supported on a first arm of said pair of arms and are biased against said first and second resistive strips.

12. The memory actuator in claim 11 including an opening in a second arm of said pair of arms, said opening generally opposite said pair of contact portions to facilitate assembly of said pair of contact portions to said first arm.

13. The memory actuator according to claim 1 wherein said body includes a pair of arms, said arms engaging said circuit board.

14. The memory actuator according to claim 13 wherein said arms straddle said circuit board.

15. The memory actuator according to claim 14 wherein at least one of said arms includes a projecting member, said projecting member engaging said circuit board.

16. The memory actuator according to claim 15 wherein each of said arms includes a projecting member, said projecting members engaging said circuit board whereby said body is pivotal on said circuit board about said projecting members.

17. The memory actuator of claim 1 wherein said body of said linear transducer is guided in a second direction by at least one restraint defined by said case.

18. A vehicular rearview mirror system memory actuator for a rearview mirror system having a reflective element and a controller, said memory actuator comprising:

a case;

at least one positioning member extending from said case to move the reflective element about at least one degree of freedom;

at least one motor driving said positioning member;

a circuit board positioned in said case, said circuit board having first and second resistive strips, said first and second resistive strips being configured to generate a signal to the controller; and a linear position transducer having a body for coupling to the reflective element and first and second contact portions supported by said body, said first contact portion being oriented for contacting said first resistive strip of said circuit board, said second contact portion being oriented for contacting said second resistive strip of said circuit board, whereby the position of said first and second contact portions along said first and second resistive strips, respectively, determines a value of said signal, said body guided at said circuit board in at least one direction and moving said first and second contact portions along said resistive strips in response to the movement of the reflective element, whereby the value of said signal is a function of the position of the reflective element.

19. The memory actuator according to claim 18 further comprising a conductive brush supported by said body, said conductive brush defining said first and second contact portions.

20. The memory actuator according to claim 19 wherein said conductive brush comprises a metal brush.

21. The memory actuator in claim 18 wherein said contact portions being electrically coupled together.

22. The memory actuator of claim 18 wherein said first resistive strip comprises a resistive element of a voltage divider circuit, said second resistive strip for producing said signal.

23. The memory actuator according to claim 18 wherein said body includes a ball member, said ball member for coupling to the reflective element.

24. The memory actuator according to claim 23 wherein said body has a glide member opposite said ball member, said glide member guided by said circuit board.

25. The memory actuator according to claim 24 wherein said glide member is guided by a track member juxtaposed with said circuit board.

26. The memory actuator according to claim 18 wherein said body includes a pair of arms, said arms engaging said circuit board.

27. The memory actuator according to claim 26 wherein said arms straddle said circuit board and move said first and second contact portions along said first and second resistive strips, respectively, in response to the movement of the reflective element.

28. The memory actuator according to claim 26 wherein at least one of said arms includes a projecting member, said projecting member engaging said circuit board.

29. The memory actuator according to claim 26 wherein each of said arms includes a projecting member, said projecting members engaging said circuit board whereby said body is pivotal on said circuit board about said projecting members.

30. The memory actuator according to claim 26 wherein said first and second contact portions are supported on a first arm of said pair of arms and are biased against said first and second resistive strips.

31. The memory actuator according to claim 30 including an opening in a second arm of said pair of arms, said opening generally opposite said first and second contact portions to facilitate assembly of said first and second contact portions to said first arm.

32. The memory actuator in claim 18 wherein said body of said linear position transducer is guided in a second direction by at least one restraint defined by said case.

33. A vehicular rearview mirror system memory actuator linear position transducer for monitoring a position of a reflective element adjustably supported by a memory actuator of a rearview mirror system, the memory actuator having a case and at least one positioning member extending from said case to move a reflective element supported by the case and at least one motor for driving the positioning member to move the reflective element, the rearview mirror system having a controller for selectively actuating said motor at least partially in response to a signal produced by the linear position transducer, said linear position transducer comprising:

a circuit board;

a body adapted to couple to the reflective element; and said body includes a pair of arms, said arms moving along the circuit board to generate a signal to the controller, the signal being a function of the position of the body along the circuit board.

34. The linear position transducer according to claim 33 wherein said circuit board has first and second resistive strips and said body includes first and second contact portions supported by said body, said first contact portion being oriented for contacting the first resistive strip, said second contact portion being oriented for contacting the second resistive strip.

35. The linear position transducer according to claim 34 further comprising a conductive brush supported by said body, said conductive brush defining said first and second contact portions.

36. The linear position transducer according to claim 35 wherein said conductive brush comprises a metal brush.

37. The linear position transducer according to claim 34 wherein said contact portions being electrically coupled together.

38. The linear position transducer according to claim 34 wherein said first resistive strip comprises a voltage divider circuit, said second resistive strip producing said signal.

39. The linear position transducer according to claim 34 wherein said first and second contact portions are supported on a first arm of said pair of arms and are biased against said first and second resistive strips.

40. The linear position transducer of claim 39 including an opening in a second arm of said pair of arms, said opening generally opposite said first and second contact portions to facilitate assembly of said contact portions to said first arm.

41. The linear position transducer according to claim 33 wherein said body includes a ball member, said ball member for coupling to the reflective element.

42. The linear position transducer according to claim 41 wherein said body has a glide member opposite said ball member, said glide member is guided by said circuit board.

43. The linear position transducer according to claim 42 wherein said glide member is guided by a track member juxtaposed with said circuit board.

44. The linear position transducer according to claim 33 wherein said arms straddle said circuit board.

45. The linear position transducer according to claim 44 wherein at least one of said arms includes a projecting member, said projecting member engaging said circuit board.

46. The linear position transducer according to claim 44 wherein each of said arms includes a projecting member, said projecting member engaging said circuit board whereby said body is pivotal on said circuit board about said projecting members.

47. A vehicular rearview mirror system memory actuator for a rearview mirror system having a reflective element and a controller, said memory actuator comprising:

a case;

a first positioning member extending from said case to move the reflective element about a first degree of freedom and a second positioning member extending from said case to move the reflective element about a second degree of freedom which does not coincide with said first degree of freedom;

a pair of motors each driving one of said positioning members;

a pair of linear position transducers each having a body for coupling to the reflective element; and a circuit board positioned in said case, said bodies of said linear position transducers each being guided at said circuit board in at least one direction and moving along said circuit board between a plurality of positions in response to the movement of the reflective element about the respective one of said degrees of freedom, said circuit board being configured to generate signals to the controller as a function of the position of the respective bodies of the linear position transducers along said circuit board.

48. The memory actuator according to claim 47 wherein each said body includes a ball member, said ball member for coupling to the reflective element.

49. The memory actuator according to claim 48 wherein each said body has a glide member opposite said ball member, said glide member guided by said circuit board.

50. The memory actuator of claim 49 wherein said glide member is guided by a track member juxtaposed with said circuit board.

51. The memory actuator according to claim 47 wherein said circuit board includes first, second, third and fourth resistive strips.

52. The memory actuator according to claim 51 wherein said first and second resistive strips are spaced apart and said third and fourth resistive strips are spaced apart, one said linear position transducer having a pair of contact portions for engaging said first and second resistive strips and the other said linear position transducer having a pair of contact portions for engaging said third and fourth resistive strips when said linear position transducers moves along said circuit board.

53. The memory actuator according to claim 52 wherein each said body includes a pair of arms, said arms engaging said circuit board.

54. The memory actuator according to claim 53 wherein said arms straddle said circuit board and move said pair of contact portions along the respective said resistive strips in response to the movement of the reflective element about the respective degree of freedom.

55. The memory actuator according to claim 53 wherein at least one of said arms includes a projecting member, said projecting member engaging said circuit board.

56. The memory actuator according to claim 53 wherein each of said arms includes a projecting member, said projecting members engaging said circuit board whereby said body is pivotal on said circuit board about said projecting members.

57. The memory actuator according to claim 53 wherein said pair of contact portions are supported on a first arm of said pair of arms and are biased against the respective said resistive strips.

58. The memory actuator in claim 57 including an opening in a second arm of said pair of arms, said opening generally opposite said pair of contact portions to facilitate assembly of said pair of contact portions to said first arm.

59. The memory actuator according to claim 47 wherein each said body includes a pair of arms, said arms engaging said circuit board.

60. The memory actuator according to claim 59 wherein said arms straddle said circuit board.

61. The memory actuator according to claim 60 wherein at least one of said arms includes a projecting member, said projecting member engaging said circuit board.

62. The memory actuator according to claim 61 wherein each of said arms includes a projecting member, said projecting members engaging said circuit board whereby said body is pivotal on said circuit board about said projecting members.

63. The memory actuator of claim 47 wherein each said body is guided in a second direction by at least one restraint defined by said case.

* * * * *